(12) United States Patent
Krammer (10) Patent No.: US 10,576,831 B2
(45) Date of Patent: Mar. 3, 2020

(54) PRIMARY UNIT COMPRISING A PLURALITY OF COIL SECTIONS FOR INDUCTIVE CHARGING

(71) Applicant: Bayerische Motoren Werke Aktiengesellschaft, Munich (DE)

(72) Inventor: Josef Krammer, Holzkirchen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 121 days.

(21) Appl. No.: 15/624,155

(22) Filed: Jun. 15, 2017

(65) Prior Publication Data

US 2017/0282724 A1    Oct. 5, 2017

Related U.S. Application Data

(63) Continuation of application No. PCT/EP2015/079840, filed on Dec. 15, 2015.

(30) Foreign Application Priority Data

Dec. 18, 2014 (DE) .................. 10 2014 226 392

(51) Int. Cl.
*H02J 7/02* (2016.01)
*B60L 11/18* (2006.01)
(Continued)

(52) U.S. Cl.
CPC ............ *B60L 11/182* (2013.01); *B60L 53/12* (2019.02); *H01F 38/14* (2013.01); *H02J 7/0052* (2013.01); *H02J 7/025* (2013.01)

(58) Field of Classification Search
CPC .. B60L 11/1829; B60L 11/1833; B60L 53/12; H02J 50/40; H02J 7/0052
(Continued)

(56) References Cited

U.S. PATENT DOCUMENTS

2008/0268348 A1  10/2008  Katoh
2010/0220505 A1   9/2010  Tsuruya
(Continued)

FOREIGN PATENT DOCUMENTS

DE    197 50 041 C1    1/1999
EP     2 586 083 B1    7/2014
(Continued)

OTHER PUBLICATIONS

International Search Report (PCT/ISA/210) issued in PCT Application No. PCT/EP2015/079840 dated Mar. 3, 2016 with English-language translation (six (6) pages).
(Continued)

*Primary Examiner* — Edward Tso
*Assistant Examiner* — Aaron Piggush
(74) *Attorney, Agent, or Firm* — Crowell & Moring LLP (57) ABSTRACT

A primary unit is provided for producing an electromagnetic charging field for inductive coupling to a secondary coil. The primary unit has a multi-part primary coil, which includes N coil sections, with N>2, which are coupled to each other on a first end in the shape of a star. Moreover, the primary unit has N half-bridges, which are each coupled to a second end of the N coil sections. In addition, the primary unit has a control unit, which is configured to control the N half-bridges in relation to the secondary coil.

17 Claims, 4 Drawing Sheets

(51) Int. Cl.
*H01F 38/14* (2006.01)
*B60L 53/12* (2019.01)
*H02J 7/00* (2006.01)

(58) Field of Classification Search
USPC .......................................... 320/104, 108, 109
See application file for complete search history.

(56) References Cited

U.S. PATENT DOCUMENTS

| | | |
|---|---|---|
| 2011/0045355 A1 | 2/2011 | Ichikawa |
| 2012/0098486 A1 | 4/2012 | Jung |
| 2012/0228953 A1* | 9/2012 | Kesler ..................... H03H 7/40 |
| | | 307/104 |
| 2014/0011100 A1 | 1/2014 | Lee et al. |
| 2015/0207335 A1* | 7/2015 | Madawala ............ B60L 11/182 |
| | | 307/104 |

FOREIGN PATENT DOCUMENTS

| | | |
|---|---|---|
| JP | 2008-5573 A | 1/2008 |
| JP | 2011-30284 A | 2/2011 |
| JP | 2011-176914 A | 9/2011 |
| WO | WO 2014/035260 A1 | 3/2014 |

OTHER PUBLICATIONS

Japanese-language Written Opinion (PCT/ISA/237) issued in PCT Application No. PCT/EP2015/079840 dated Mar. 3, 2016 (six (6) pages).

German Search Report issued in counterpart German Application No. 10 2014 226 396.4 dated Oct. 23, 2015 with partial English-language translation (fourteen (14) pages).

\* cited by examiner

PRIMARY UNIT COMPRISING A PLURALITY OF COIL SECTIONS FOR INDUCTIVE CHARGING

CROSS REFERENCE TO RELATED APPLICATIONS

This application is a continuation of PCT International Application No. PCT/EP2015/079840, filed Dec. 15, 2015, which claims priority under 35 U.S.C. § 119 from German Patent Application No. 10 2014 226 392.1, filed Dec. 18, 2014, the entire disclosures of which are herein expressly incorporated by reference.

BACKGROUND AND SUMMARY OF THE INVENTION

The invention relates to a device for inductively charging a vehicle.

Vehicles with an electric drive typically have a battery in which electrical energy for operating an electrical machine of the vehicle can be stored. The battery of the vehicle can be charged with electrical energy from an electrical power supply system. For this purpose, the battery is coupled to the electrical power supply system in order to transmit the electrical energy from the electrical power supply system to the battery of the vehicle. The coupling can be implemented using wires (by means of a charging cable) and/or in a wireless manner (using an inductive coupling between a charging station and the vehicle).

Figure 1:
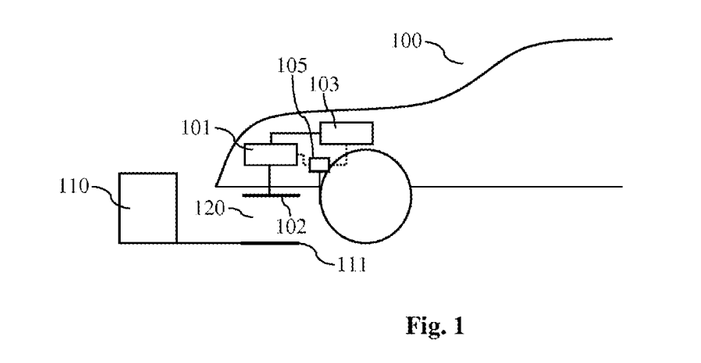
FIG. 1 is a schematic illustration of exemplary components of an inductive charging system.

One approach for automatic, cable-free, inductive charging of the battery of the vehicle involves transmitting the electrical energy to the battery from the floor to the underbody of the vehicle by means of magnetic induction across the underbody ground clearance 120. This is illustrated, by way of example, in FIG. 1. In particular, FIG. 1 shows a vehicle 100 with a storage device 103 for electrical energy (e.g. with a chargeable battery 103). The vehicle 100 has what is referred to as a secondary coil in the underbody of the vehicle, wherein the secondary coil is connected to the storage device 103 by means of an impedance matching arrangement, not shown, and a rectifier 101. The secondary coil is typically part of what is referred to as a "wireless power transfer" (WPT) vehicle unit 102.

The secondary coil of the WPT vehicle unit 102 can be positioned above a primary coil, wherein the primary coil is mounted, for example, on the floor of a garage. The primary coil is typically part of what is referred to as a WPT floor unit 111. The primary coil is connected to a power supply 110 (in this document also referred to as charging unit 110). The power supply 110 can comprise a radiofrequency generator, which generates an AC (Alternating Current) in the primary coil of the WPT floor unit 111, as a result of which a magnetic field is induced. This magnetic field is also referred to as an electromagnetic charging field in this document. The electromagnetic charging field can have a predefined charging-field frequency range. The charging-field frequency range (i.e. the operating frequency) can lie in the frequency range of 80-90 kHz (in particular at 85 kHz).

Given sufficient magnetic coupling between the primary coil of the WPT floor unit 111 and the secondary coil of the WPT vehicle unit 102 across the underbody ground clearance 120, the magnetic field induces a corresponding voltage and therefore also a current in the secondary coil. The induced current in the secondary coil of the WPT vehicle unit 102 is rectified by the rectifier 101 and stored in the storage device 103 (e.g. in the battery). It is therefore possible to transmit electrical energy in a cable-free manner from the power supply 110 to the energy storage device 103 of the vehicle 100. The charging process can be controlled in the vehicle 100 by a charging controller 105 (also referred to as a WPT controller 105). To this end, the charging controller 105 can be configured to communicate, for example in a wireless manner, with the charging unit 110 (e.g. with a wall box) or with the WPT floor unit 111.

Various systems for inductively charging electric vehicles are currently being developed. Here, in particular, various designs for the geometric arrangement of the coils and the associated field geometry (e.g. circular coils, solenoid coils or double-D coils) are being pursued. On account of the different geometric arrangements, there may be incompatibilities between the secondary coil that is built into a vehicle 100 and the primary coil that is built into a floor unit 111. Incompatibilities of this kind may result in a reduced (or even non-existent) coupling between the primary coil and the secondary coil and thus in a reduced (or even non-existent) energy transfer. Furthermore, when using coils having different coil geometries, the demands on precise positioning of the primary coil and the secondary coil are further increased.

The present document concerns the technical problem of providing a cost-effective primary coil that enables an increased degree of compatibility with secondary coils and/or enables reduced demands on the positioning of secondary coils.

The problem is solved by providing a primary unit in accordance with embodiments of the invention.

In accordance with one aspect, a primary unit for generating an electromagnetic charging field for inductive coupling to a secondary coil is described. The primary unit may be part of a WPT floor unit of a charging station for inductively charging an energy storage device of a vehicle. That is to say that the primary unit may be configured to inductively charge an electrical storage unit of a vehicle.

The primary unit includes a multipartite primary coil, which includes N coil elements, where N>2. The N coil elements are coupled to one another in a star configuration at a respective first end. The N coil elements may comprise or be N circular coil elements, wherein the N circular coil elements may be arranged laterally alongside one another in one plane.

By way of example, it is possible that N=3. The N coil elements then include a first coil element, a second coil element and a third coil element. The first coil element may be arranged on a first side of the second coil element and the third coil element may be arranged on a second side of the second coil element, said second side lying opposite the first side of the second coil element. A charging field for different types of secondary coil can be generated efficiently by means of a multipartite primary coil of this type. Furthermore, it is possible to compensate for a lateral offset between the multipartite primary coil and the secondary coil.

In a further example, N=5. The N coil elements may include a central coil element, which is surrounded by four further coil elements. A charging field for different types of secondary coils can be generated efficiently by a multipartite primary coil of this type as well. Furthermore, it is possible to compensate for a lateral offset and an offset in the longitudinal direction between the multipartite primary coil and the secondary coil. In addition, it is possible to compensate for relative rotations between the primary coil and the secondary coil.

The primary unit further includes N half-bridges, which in each case are coupled to a respective second end of the N coil elements. Here, the second end of a coil element is opposite the first end of the coil element. Each coil element is therefore connected to a corresponding half-bridge. A half-bridge is typically configured to couple the second end of a coil element alternately to a first potential (e.g. to ground) and to a second potential (e.g. to a supply voltage or to a DC voltage derived from the supply system voltage). By alternately coupling the second end of the coil element to different potentials, an alternating current that induces an electromagnetic charging field can be generated in the coil element. On the other hand, the switches of a half-bridge can also be kept open in order to prevent a current through the corresponding coil element.

The primary unit further includes a control unit, which is configured to drive the N half-bridges depending on the secondary coil. In particular, the control unit may be configured to drive the N half-bridges depending on a type of the secondary coil and/or depending on a position of the secondary coil relative to the multipartite primary coil. Examples of types of the secondary coil are a solenoid type, a double-D type and/or a circular type. A charging field for a multiplicity of different types of secondary coils can therefore be generated efficiently by the primary unit, said charging field inducing a charging current in the secondary coil. The primary unit is particularly cost-effective as only one half-bridge is used for each coil element.

The primary unit may furthermore include N capacitors. The N capacitors may be arranged in each case in series with the N coil elements. A capacitor may, together with a coil element, form a resonant circuit. A resonant frequency of the resonant circuit may correspond to the charging frequency of the charging field generated by the primary unit.

The control unit may be configured to operate at least two of the N half-bridges mutually in differential mode. An alternating current through the at least two corresponding coil elements of the multipartite primary coil is therefore possible. Furthermore, it is possible for a current to flow through the at least two coil elements in the opposite direction. Alternatively or in addition, the control unit may be configured to operate at least two of the N half-bridges mutually in common mode. It is therefore possible, when a current flows through the corresponding coil elements, for the current through the corresponding coil elements to have the same direction (i.e. from the second end to the first end of the coil element or vice versa). Alternatively or in addition, the control unit may be configured to operate at least one of the N half-bridges in such a way that no current flows through the corresponding coil element. The corresponding coil element can therefore be excluded from the generation of an electromagnetic charging field.

By operating the half-bridges in differential mode, in common mode and/or by deactivating a half-bridge, it is possible to generate different geometries of charging fields efficiently. The primary unit may therefore be adapted to different types of secondary coils and/or to different offset situations.

The control unit may be configured to operate at least two of the N half-bridges with a charging frequency, wherein the charging frequency corresponds to a frequency of the electromagnetic charging field. In particular, the at least two half-bridges may be operated in differential mode with the charging frequency in order to generate an alternating current with the charging frequency through the corresponding coil elements. For differential mode operation, a "low side" switch of a first half-bridge may be closed when a "high side" switch of a second half-bridge is closed (the "high side" switch of the first half-bridge and the "low side" switch of the second half-bridge are then open). Furthermore, the "high side" switch of the first half-bridge may be closed when the "low side" switch of the second half-bridge is closed (the "low side" switch of the first half-bridge and the "high side" switch of the second half-bridge are then open).

The control unit may be configured to determine a type of the secondary coil (e.g. the type of the secondary coil may be communicated from a vehicle to a charging station in the context of charging communication). Furthermore, the control unit may be configured to determine predefined operating data for the N half-bridges depending on the determined type of the secondary coil. The predefined operating data may be stored in a storage unit (e.g. in a storage unit of the charging station). The predefined operating data may be stored in the form of a characteristic diagram and/or in the form of a table. In particular, different predefined operating data may be stored for different types of secondary coil. The control unit may then be configured to drive the N half-bridges in accordance with the predefined operating data. It is therefore possible to adapt the operation of the primary unit to the type of secondary coil efficiently.

The control unit may be further configured to determine the position of the secondary coil relative to the multipartite primary coil. Here, the position may comprise a lateral offset between the secondary coil and the multipartite primary coil. The relative position may be determined, for example, by evaluating image data. For this purpose, the primary unit may optionally include a camera, which is configured to capture image data regarding the secondary coil. The predefined operating data may then also be determined depending on the determined position. It is therefore possible to adapt the operation of the primary unit to different offset situations efficiently.

In accordance with a further aspect, a charging station for a vehicle is described, wherein the charging station includes a primary unit that is described in this document.

It should be noted that the methods, devices and systems that are described in this document may be used both alone and in combination with other methods, devices and systems that are described in this document. Furthermore, any aspects of the methods, devices and systems that are described in this document may be combined with one another in a variety of ways. In particular, the features of the claims may be combined with one another in a variety of ways.

Other objects, advantages and novel features of the present invention will become apparent from the following detailed description of one or more preferred embodiments when considered in conjunction with the accompanying drawings.

DETAILED DESCRIPTION OF THE DRAWINGS

As stated at the outset, the present document concerns providing a WPT floor unit 111 for a charging station 110, 111 in order to enable inductive charging of vehicles 100 with different coil geometries.

Figure 2A:
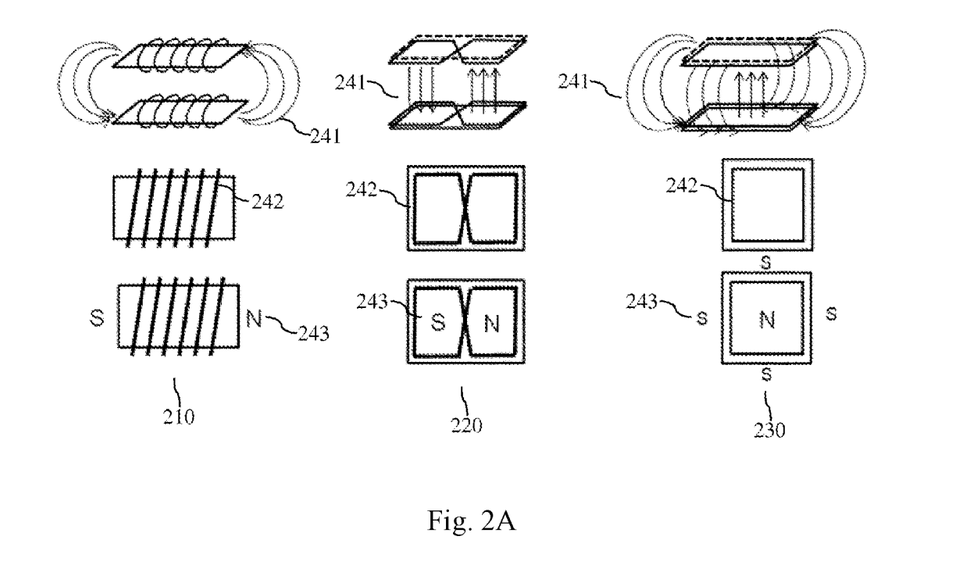
FIG. 2A shows exemplary coil geometries and corresponding field geometries.

FIG. 2A shows exemplary primary coils 243 and corresponding secondary coils 242, as well as the associated profile of the electromagnetic charging field 241. FIG. 2A shows, in particular, the use of solenoid coils (coil type 210), double-D coils (coil type 220) and circular coils (coil type 230). On account of the different geometries of the electromagnetic charging fields 241, incompatibilities arise between the different coil types 210, 220, 230. For example, no current can be induced in a circular secondary coil 242 by a solenoid or double-D primary coil 243. Analogously, no current can be induced in a solenoid or double-D secondary coil 242 by a circular primary coil 243.

It is therefore necessary to have different primary coils available at public charging points in order to enable inductive charging of vehicles 100 with different coil types 210, 220, 230. As a result of this, the costs of public charging points are substantially increased.

Figure 2B:
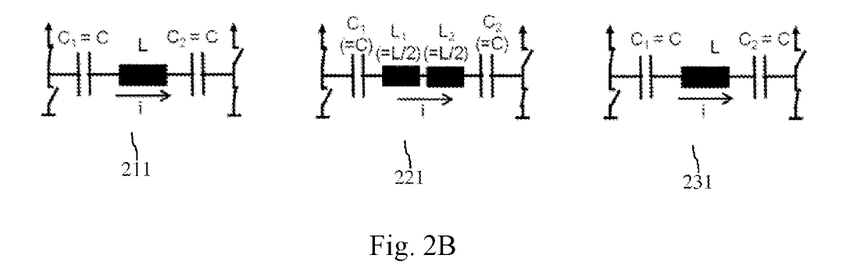
FIG. 2B shows exemplary arrangements for generating an electromagnetic charging field.

FIG. 2B shows exemplary drive circuits 211, 221, 231 for generating the electromagnetic charging fields 241 of the different coil types 210, 220, 230. The drive circuits 211, 221, 231 comprise in each case two half-bridges, which are operated in differential mode, in order to generate an alternating current with a charging frequency through the respective primary coils 243. Furthermore, the drive circuits 211, 221, 231 comprise capacitors C for providing a resonant circuit in interaction with the respective primary coils 243. As can be seen from FIG. 2B, the drive circuit 211 for the coil type 210 (solenoid) may correspond to the drive circuit 231 for the coil type 230 (circular).

Figure 3:
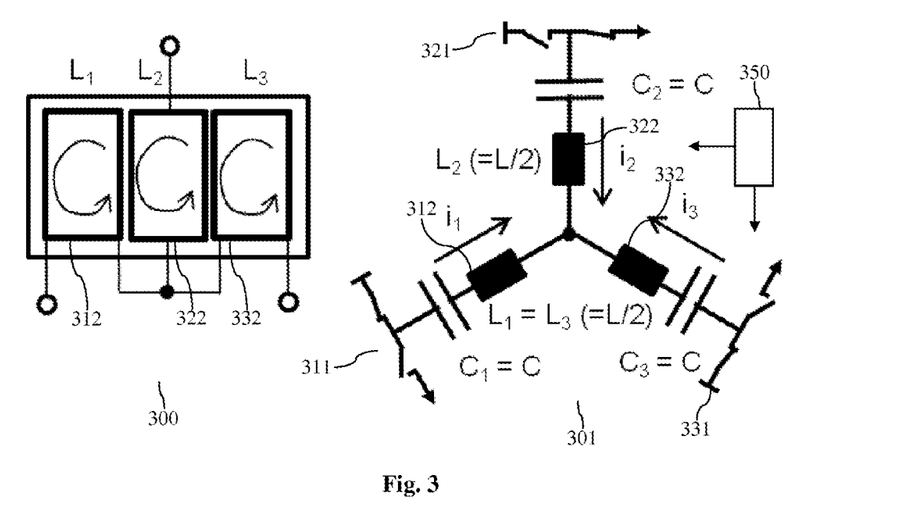
FIG. 3 shows an exemplary design of a generic primary coil for coupling to secondary coils of a different type.

FIG. 3 shows an exemplary generic multipartite primary coil 300. The generic primary coil 300 comprises a multiplicity of circular coils 312, 322, 332 arranged alongside one another. The coils 312, 322, 332 of the primary coil 300 may be referred to as coil elements. The multiplicity of circular coils 312, 322, 332 is arranged in a star configuration, i.e. the circular coils 230 are coupled to one another at a central star point.

FIG. 3 further shows an exemplary drive circuit 301 of the generic primary coil 300. The drive circuit 301 comprises a half-bridge 311, 321, 331 for each circular coil 312, 322, 332 of the generic primary coil 300. For each circular coil 312, 322, 332, one end is therefore connected to the central star point and another end is connected to a dedicated half-bridge 311, 321, 331. In order to provide a resonant circuit, each branch of the drive circuit 301 may comprise at least one capacitor C. The individual coil elements may be connected to capacitors C in such a way that the resultant resonant circuits have in each case the same resonant frequency. The resonant circuits may be operated with the operating frequency prescribed by a control unit 350 by way of the switches of the half-bridges 311, 321 and 331.

Different geometries of electromagnetic charging fields may be generated by suitably driving the half-bridges 311, 321, 331. FIG. 3 shows the control unit 350, which is configured to drive the half-bridges 311, 321, 331 (i.e. in particular the switches of the half-bridges 311, 321, 331) in order to generate an electromagnetic charging field. In particular, the control unit 350 is configured to drive the half-bridges 311, 321, 331 of the multipartite primary coil 300 depending on the type 210, 220, 230 of a secondary coil 242 arranged above the primary coil 300 in order to generate a charging field, which induces a charging current in the secondary coil 242.

Figure 4:
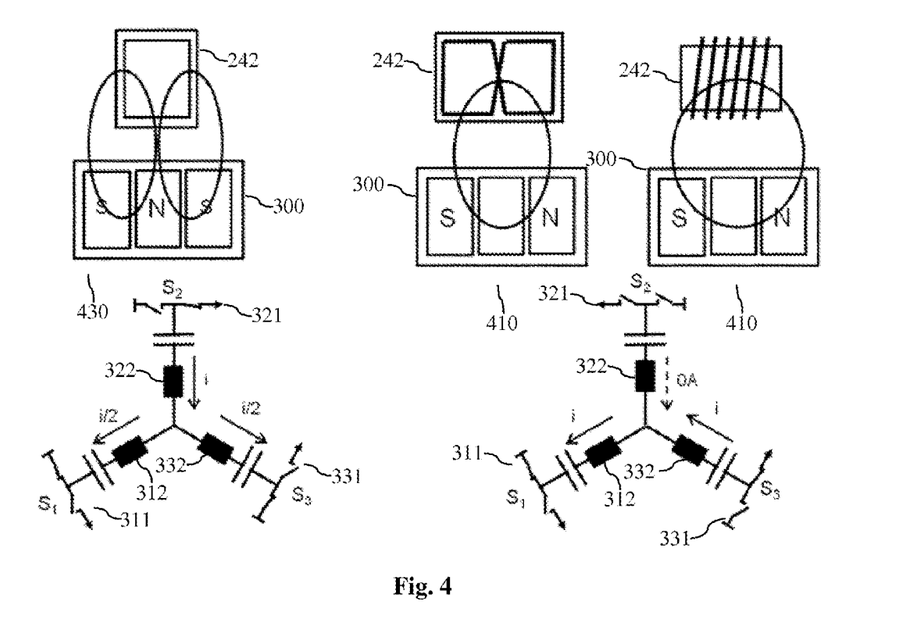
FIG. 4 shows exemplary drive systems of the generic primary coil for generating electromagnetic charging fields of a different type.

FIG. 4 illustrates the different drive systems of the half-bridges 311, 321, 331 for generating charging fields with different geometries. The first half-bridge 311 and the third half-bridge 331 may be operated mutually in common mode and in differential mode with the second half-bridge 321. Here, the first half-bridge 311 is coupled to the first circular coil 312, the second half-bridge 321 is coupled to the second circular coil 322 and the third half-bridge 331 is coupled to the third circular coil 332. As illustrated in FIG. 3 (left-hand side), the second coil 322 is arranged locally between the first coil 312 and the third coil 332. The above-described driving of the half-bridges 311, 321, 331 can generate the electromagnetic charging field 430. As can be seen from FIG. 4, the electromagnetic charging field 430 can induce a charging current within a circular secondary coil 242.

Alternatively, the first half-bridge 311 and the third half-bridge 331 may be operated mutually in differential mode. To that end, the second half-bridge 321 may be used to keep the second coil 322 continuously free of current (e.g. in that both switches of the second half-bridge 321 remain open). The electromagnetic charging field 410 may be generated by such operation. As can be seen from FIG. 4, the electromagnetic charging field 410 can induce a charging current within a double-D secondary coil 242 or a solenoid secondary coil 242.

By using three basic coils 312, 322, 332 and by using three half-bridges 311, 321, 331, it is therefore possible to provide a multipartite primary coil 300 that can generate different geometries of electromagnetic charging fields 410, 430 for different geometries of secondary coils 242. The design of a generic primary coil 300 and the corresponding drive system 301 illustrated in FIG. 3 are cost-efficient because, in particular, the number of half-bridges 311, 321, 331 for driving the coils may be reduced (e.g. halved) in comparison with the use of separate primary coils 243 of a different type 210, 220, 230.

It is therefore proposed to divide the primary coil 300 into a plurality of (e.g. into three) coil elements 312, 322, 332. By skillfully driving all the coil elements 312, 322, 332, different secondary coil topologies 210, 220, 230 can be excited efficiently. The excitation current for generating an electromagnetic charging field 410, 430 is divided here between individual coil branches (i.e. between the individual coil elements 312, 322, 332). In total, the same drive power as in the case of "single coils" is required to generate a charging field 410, 430. Therefore, approximately the same losses occur in the primary units as in the case of a single-part primary coil. The generic primary coil 300 therefore does not exhibit increased losses in comparison with dedicated primary coils 243 of a different type 210, 220, 230.

It should be noted that current (except for possibly different signs) flows through the coil elements 312, 322, 332 in the same phase. The currents in the branches of the multipartite primary coil 300 are therefore not 3-phase currents.

The primary coil 300 can therefore be used to compensate for an offset between the WPT floor unit 111 and the WPT vehicle unit 102. In particular, the individual coil elements 312, 322, 332 of the primary coil 300 can be driven depending on a position of the secondary coil 242 relative to the primary coil 300. For example, in the case of a circular secondary coil 242 that is located (possibly only) above the first coil element 312, the first half-bridge 311 and the second half-bridge 321 may be operated mutually in differential mode, whereas the third half-bridge 331 keeps the third coil element 332 free of current. Furthermore, it is therefore possible to ensure sufficient coupling, even in the case of an offset between the WPT floor unit 111 and the WPT vehicle unit 102.

In order to determine a switching sequence of the half-bridges 311, 321, 331 for different offset situations and/or for different coil types 210, 220, 230, a characteristic diagram that is predefined for each secondary coil type 210, 220, 230 can be used, said characteristic diagram defining the switching sequence ($S_1$, $S_2$, $S_3$) for the half-bridges 311, 321, 331 depending on the respective (lateral) offset. For further optimization, the characteristic diagram may also depend on the vertical distance between the primary coil 300 and the secondary coil 242.

Figure 5:
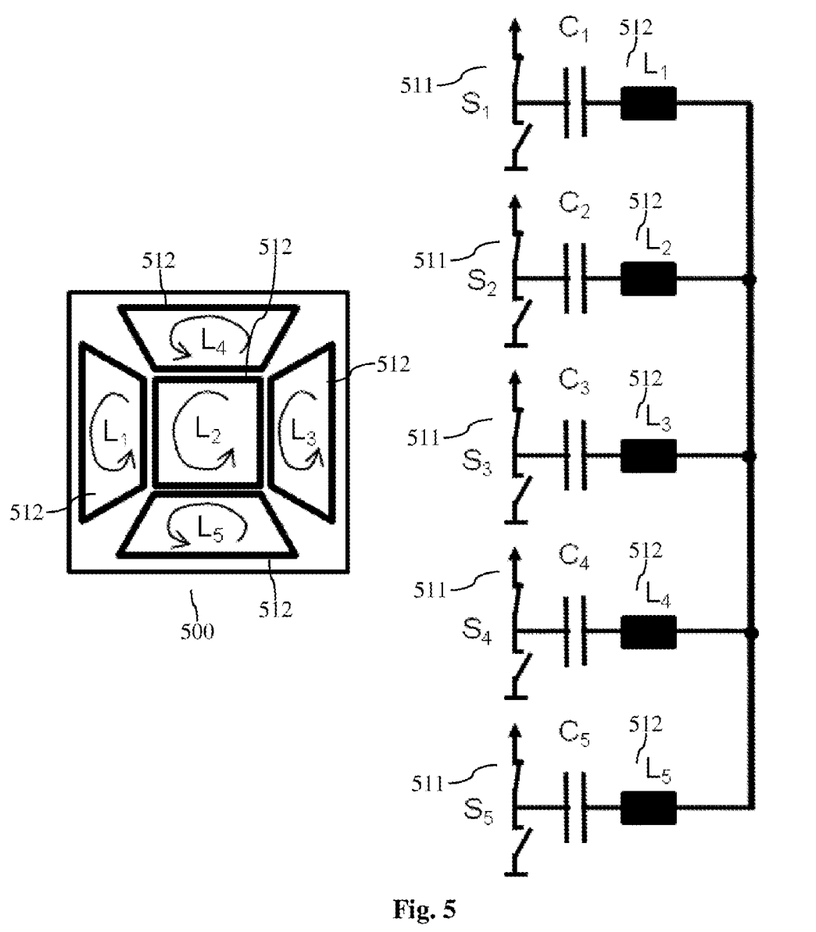
FIG. 5 shows a further exemplary design of a generic primary coil.

The coil elements 312, 332, 332 may in each case have the same inductance and shape, i.e. the primary coil 300 may be constructed in a symmetrical manner. However, it may also be useful, where appropriate, to use differently shaped coil elements (as shown in FIG. 5, for example). FIG. 5 shows a primary coil 500, which includes five coil elements 512 that are arranged in star. Each of the coil elements 512 may be driven by a dedicated half-bridge 511. The multipartite primary coil 500 illustrated in FIG. 5 may also induce charging currents in wound secondary coils 242. Furthermore, in addition to the adaptation to different coil types 210, 220, 230, an adaptation to a displacement of the secondary coil 242 in two horizontal dimensions is also possible. In the case of the primary coil 500, it is also possible to control the switching sequence $S_1$, $S_2$, $S_3$, $S_4$, $S_5$ for the half-bridges 511 by means of a family of characteristics (x, y, z), where x corresponds to a lateral offset between the primary coil 500 and the secondary coil 242, y corresponds to an offset in the longitudinal direction between the primary coil 500 and the secondary coil 242 and z corresponds to a vertical distance between the primary coil 500 and the secondary coil 242. The geometry of the coil elements 512 may be adapted (or optimized) in such a way that different types 210, 220, 230 of secondary coil 242 can be operated within a predefined tolerance range. This can be achieved by means of a numerical optimization problem.

This document has described generic primary coils 300, 500, which can induce a charging current in secondary coils 242 of a different type 210, 220, 230. Furthermore, different drive systems of the coil elements of the described primary coils 300, 500 enable an extended tolerance when positioning the WPT vehicle unit 102 with respect to the WPT floor unit 111. The multipartite primary coil 300, 500 can be driven in a cost-efficient manner by dedicated half-bridges. In particular, by using a multipartite primary coil 300, 500, there is no need for multiple implementation of different coils and drive circuits.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A primary unit for generating an electromagnetic charging field for inductive coupling to a secondary coil, the primary unit comprising:

a multipartite primary coil, which comprises N coil elements, where N>2, which are coupled to one another in star at a respective first end;

N half-bridges, which in each case are coupled to a respective second end of the N coil elements; and a control unit, which is configured to drive the N half-bridges depending on at least one of a position, a type and a shape of the secondary coil, wherein current only flows through the N coil elements in the same phase.

2. The primary unit as claimed in claim 1, wherein the coil elements comprise circular coil elements, which are arranged laterally alongside one another.

3. The primary unit as claimed in claim 1, wherein

N=3;

the N coil elements comprise a first coil element, a second coil element and a third coil element;

the first coil element is arranged on a first side of the second coil element; and the third coil element is arranged on a second side of the second coil element, said second side lying opposite the first side of the second coil element.

4. The primary unit as claimed in claim 2, wherein

N=3;

the N coil elements comprise a first coil element, a second coil element and a third coil element;

the first coil element is arranged on a first side of the second coil element; and the third coil element is arranged on a second side of the second coil element, said second side lying opposite the first side of the second coil element.

5. The primary unit as claimed in claim 1, wherein

N=5; and the N coil elements comprise a central coil element, which is surrounded by four further coil elements.

6. The primary unit as claimed in claim 2, wherein

N=5; and the N coil elements comprise a central coil element, which is surrounded by four further coil elements.

7. The primary unit as claimed in claim 1, wherein the control unit is configured to:

operate at least two of the N half-bridges mutually in differential mode;

operate at least two of the N half-bridges mutually in common mode; and/or operate at least one of the N half-bridges in such a way that no current flows through the corresponding coil element.

8. The primary unit as claimed in claim 3, wherein the control unit is configured to:

operate at least two of the N half-bridges mutually in differential mode;

operate at least two of the N half-bridges mutually in common mode; and/or operate at least one of the N half-bridges in such a way that no current flows through the corresponding coil element.

9. The primary unit as claimed in claim 5, wherein the control unit is configured to:

operate at least two of the N half-bridges mutually in differential mode;

operate at least two of the N half-bridges mutually in common mode; and/or operate at least one of the N half-bridges in such a way that no current flows through the corresponding coil element.

10. The primary unit as claimed in claim 1, wherein the control unit is configured to operate at least two of the N half-bridges with a charging frequency; wherein the charging frequency corresponds to a frequency of the electromagnetic charging field.

11. The primary unit as claimed in claim 1, wherein the control unit is configured to drive the N half-bridges depending on a type of the secondary coil and/or depending on a position of the secondary coil relative to the multipartite primary coil.

12. The primary unit as claimed in claim 11, wherein the secondary coil is of solenoid type, double-D type and/or circular type.

13. The primary unit as claimed in claim 12, wherein the control unit is configured to:
    determine a type of the secondary coil;
    determine predefined operating data for the N half-bridges depending on the determined type; and
    drive the N half-bridges in accordance with the predefined operating data.

14. The primary unit as claimed in claim 11, wherein the control unit is configured to:
    determine a type of the secondary coil;
    determine predefined operating data for the N half-bridges depending on the determined type; and
    drive the N half-bridges in accordance with the predefined operating data.

15. The primary unit as claimed in claim 13, wherein the control unit is configured to:
    determine the position of the secondary coil relative to the multipartite primary coil; wherein the position comprises a lateral offset between the secondary coil and the multipartite primary coil; and
    determine the predefined operating data depending on the determined position as well.

16. The primary unit as claimed in claim 14, wherein the control unit is configured to:
    determine the position of the secondary coil relative to the multipartite primary coil; wherein the position comprises a lateral offset between the secondary coil and the multipartite primary coil; and
    determine the predefined operating data depending on the determined position as well.

17. The primary unit as claimed in claim 1, wherein the primary unit is configured to inductively charge an electrical storage unit of a vehicle.

* * * * *